United States Patent
Heo

(10) Patent No.: US 12,330,581 B2
(45) Date of Patent: Jun. 17, 2025

(54) AIRBAG DEVICE

(71) Applicant: HYUNDAI MOBIS CO., LTD., Seoul (KR)

(72) Inventor: Jeong Mo Heo, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/809,897

(22) Filed: Aug. 20, 2024

(65) Prior Publication Data

US 2025/0136033 A1    May 1, 2025

(30) Foreign Application Priority Data

Oct. 27, 2023    (KR) .......................... 10-2023-0145394

(51) Int. Cl.
*B60R 21/261* (2011.01)
*B60R 21/30* (2006.01)

(52) U.S. Cl.
CPC ............ *B60R 21/261* (2013.01); *B60R 21/30* (2013.01)

(58) Field of Classification Search
CPC .............................. B60R 21/261; B60R 21/30
See application file for complete search history.

(56) References Cited

U.S. PATENT DOCUMENTS

| | | | | | |
|---|---|---|---|---|---|
| 4,877,264 | A | * | 10/1989 | Cuevas | B60R 21/2032 280/739 |
| RE33,938 | E | * | 5/1992 | Cuevas | B60R 21/30 280/739 |
| 6,106,002 | A | * | 8/2000 | Haesaert | B60R 21/217 280/736 |

FOREIGN PATENT DOCUMENTS

| | | | | |
|---|---|---|---|---|
| DE | 10340913 B3 | * | 1/2005 | ............ B60R 21/30 |
| DE | 10340910 A1 | * | 4/2005 | ............ B60R 21/30 |
| KR | 10-2020-0055323 A | | 5/2020 | |
| KR | 10-2021-0045732 A | | 4/2021 | |

OTHER PUBLICATIONS

DE-10340910-A1 (machine translation) (Year: 2005).*
DE-10340913-B3 (machine translation) (Year: 2005).*

* cited by examiner

*Primary Examiner* — Jason D Shanske
*Assistant Examiner* — Joselynn Y Sliteris
(74) *Attorney, Agent, or Firm* — NSIP Law

(57) ABSTRACT

An airbag device includes an inflator to discharge a gas; a retainer configured to cover the inflator and to define a passage to linearly guide the gas; and an airbag housing having external air holes to allow external air to be supplied into the passage by the gas passing through the passage at high speed. The external air holes are disposed at a middle portion of the passage.

9 Claims, 4 Drawing Sheets

AIRBAG DEVICE

CROSS REFERENCE TO RELATED APPLICATIONS

The present application claims priority to Korean Patent Application No. 10-2023-0145394, filed Oct. 27, 2023, the entire contents of which is incorporated herein for all purposes by this reference.

BACKGROUND

1. Technical Field

The present disclosure relates to an airbag device configured to fill external air into an airbag cushion with a gas in an inflator so that the airbag device is capable of preventing the risk of damage to the airbag cushion by reducing the temperature of the gas and inflating the airbag cushion of a large volume without increasing the capacity of the inflator.

2. Description of the Related Art

A driver's seat airbag is assembled to a steering wheel.

An airbag module of the driver's seat airbag is configured such that an airbag cushion and an inflator are mounted in an airbag housing and an airbag cover is assembled to cover up the airbag housing.

Accordingly, in case of an impact to a vehicle, when the inflator detects a signal from a sensor, an ignition device momentarily explodes and burns a gas-generating agent to generate gas.

As the gas generated as described above is supplied into the airbag cushion, proper inflation of the airbag cushion absorbs an impact of a passenger to reduce or prevent injury, thereby securing the safety of the passenger.

Meanwhile, because the gas generated from the inflator has high temperature and pressure, the airbag cushion may be damaged when the gas directly touches the airbag cushion.

To solve this problem, the airbag cushion is manufactured using a material that can withstand high temperature and pressure, and many layers of reinforcing material are added inside the airbag cushion to reinforce the airbag cushion so that it is possible to prevent the airbag cushion from being damaged by the gas.

However, in order to reinforce the airbag cushion in a multi-layered structure, the number of reinforcing materials excessively increases causing a problem of increasing the manufacturing cost and weight of airbags.

Furthermore, since an existing airbag is configured to fill only gas generated from an inflator into an airbag cushion, when a larger capacity airbag is required also, a larger size, heavier, larger capacity inflator should be used, and the disadvantage of increasing the manufacturing cost and weight of an airbag occurs.

The description provided above as a related art of the present disclosure is just to help understand the background of the present disclosure and should not be construed as being included in the related art known by those skilled in the art.

SUMMARY

The present disclosure has been proposed to solve the above problems and is intended to provide an airbag device configured to fill external air into an airbag cushion with a gas of an inflator, thereby reducing the temperature of the gas to prevent the risk of damage to the airbag cushion and inflating the airbag cushion of a large volume without increasing the capacity of the inflator.

In order to achieve the objective of the present disclosure, there is provided an airbag device including an inflator configured to discharge a gas; a retainer configured to cover the inflator and to define a passage to linearly guide the gas; and an airbag housing having external air holes to allow external air to be supplied into the passage by the gas passing through the passage at high speed. The external air holes are disposed at a middle portion of the passage.

The inflator may be mounted to the airbag housing; and the retainer may be mounted to the airbag housing and spaced apart from the airbag housing, and the spacing between the retainer and the airbag housing may define the passage.

The retainer may include a guiding part extending from a circumference of the retainer in a radial direction; and a mounting plate may be disposed in the airbag housing in the radial direction in parallel to the guiding part and the passage may be defined between the guiding part and the mounting plate in the radial direction.

The airbag housing and the retainer may be supported by each other with spacing blocks disposed between the airbag housing and the retainer so that the airbag housing and the retainer may be spaced apart from each other.

The spacing blocks may be partially arranged along a circumference of the passage around the inflator.

The spacing blocks may be regularly arranged on the circumference of the passage based on a vertical center shaft of the inflator.

The spacing blocks may be disposed at positions spaced apart from the external air holes.

The external air holes may be disposed in the mounting plate.

The external air holes may be partially arranged along a circumference of the passage around the inflator.

The external air holes may be regularly arranged along the circumference of the passage based on a vertical center shaft of the inflator.

Through the above-described technical solution, the present disclosure has the following effects. As gas flows at high speed along the passage, a pressure difference occurs where the pressure at the first end of each external air hole that is connected to the passage becomes lower than the surrounding pressure according to Bernoulli's law, and atmospheric pressure pushes external air into the external air holes by the pressure difference so that the external air is introduced into the passage.

Therefore, as the external air at a relatively low temperature is introduced into the airbag cushion with the gas of the inflator, the temperature of the gas filled in the airbag cushion is reduced and it is possible to prevent the airbag cushion from being damaged due to a high-temperature gas.

Moreover, as external air is introduced into the airbag cushion with the gas of the inflator, the airbag cushion of a large volume can be inflated without increasing the capacity of the inflator.

DETAILED DESCRIPTION

Figure 1:
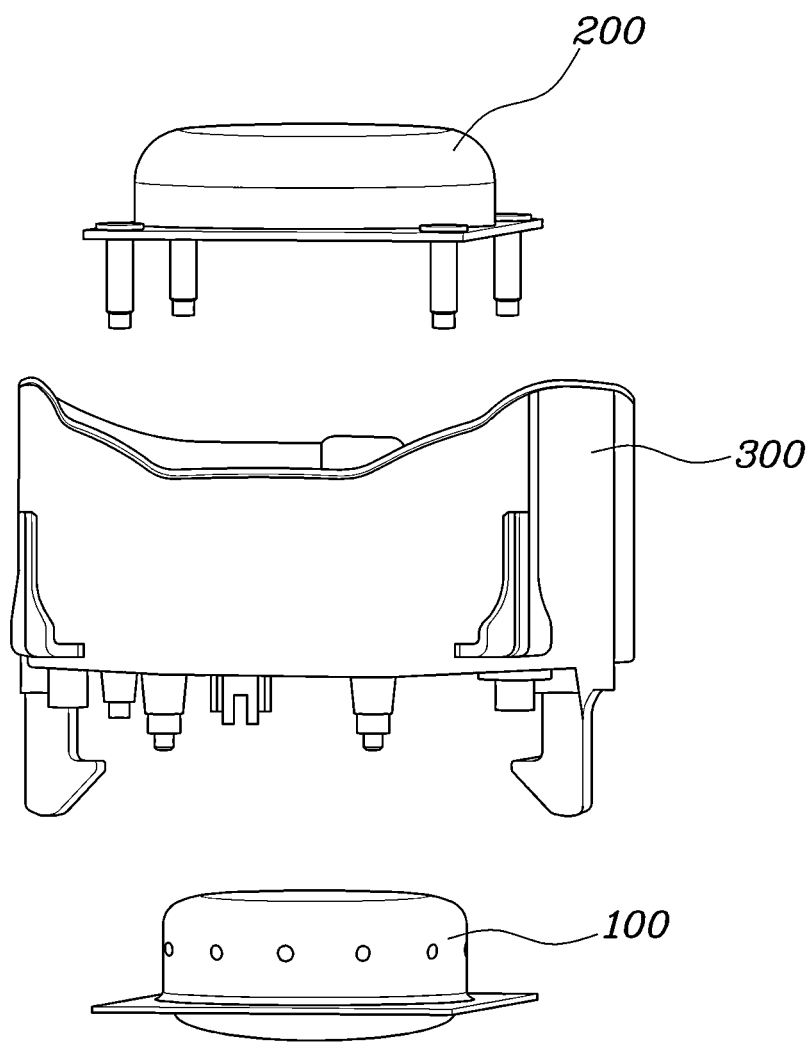
FIG. 1 is an exploded view illustrating an airbag device according to an exemplary embodiment of the present disclosure.

Hereafter, an embodiment of the present disclosure will be described in detail with reference to the accompanying drawings and the same or similar components are given the same reference numerals regardless of the numbers of figures and are not repeatedly described.

The suffixes "module" and "part" for the components used in the following description are given or mixed in consideration of only the ease of writing the specification, and do not have distinct meanings or roles by themselves.

In the following description, if it is decided that the detailed description of known technologies related to the present disclosure makes the subject matter of the embodiment described herein unclear, the detailed description is omitted. Furthermore, the accompanying drawings are provided only for easy understanding of the embodiment disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

An exemplary embodiment of the present disclosure will be described in detail in the accompanying drawings.

The airbag device of the present disclosure includes: a retainer 200 having a form covering an inflator 100 and forming a passage (P) to linearly guide a gas discharged from the inflator 100; and an airbag housing 300 having external air holes 330 which are formed at a middle portion of the passage (P) and communicate with the outside part so that external air is supplied into the passage (P) by the high-speed gas passing through the passage (P).

Figure 2:
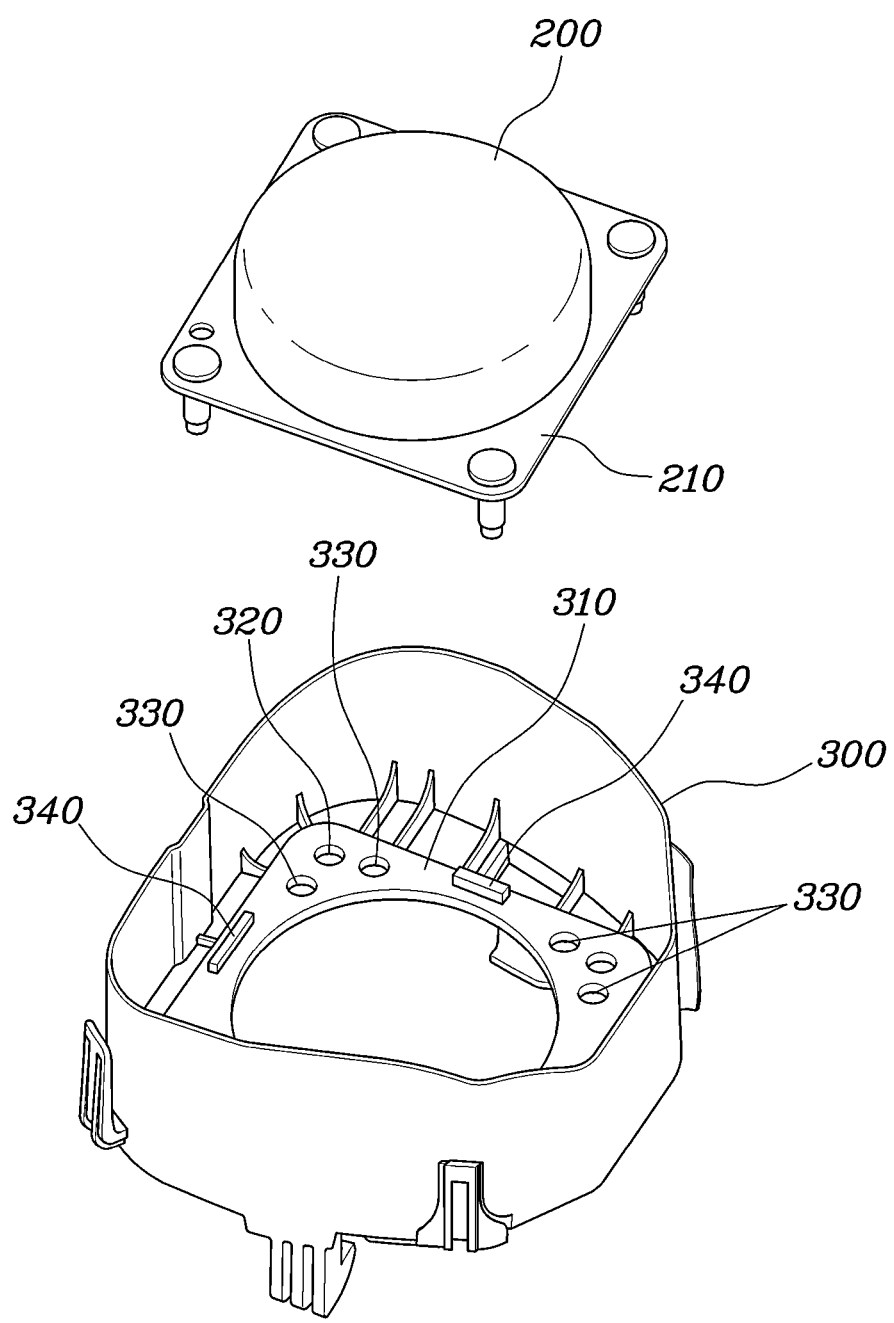
FIG. 2 is an exploded perspective view illustrating an inside form of an airbag housing according to the exemplary embodiment of the present disclosure by separating a retainer from the airbag housing.

In describing with reference to FIGS. 1 and 2, an airbag module of a driver's seat airbag device is assembled in a form in which an airbag cushion and the inflator 100 are mounted to the airbag housing 300 and the airbag housing 300 is covered with an airbag cover.

More specifically, a mounting plate 310 is formed inside the airbag housing 300, and a circular hole is formed in the center portion of the mounting plate 310.

The center portion of the inflator 100 protrudes upward while being inserted into the center hole of the mounting plate 310 from below the airbag housing 300, and the circumference of the inflator 100 is fixed to a lower surface of the mounting plate 310.

In addition, outlets are provided along the circumference of the inflator 100, and a gas generated from the inflator 100 is discharged through the outlets.

In addition, the retainer 200 has the form of a hat and covers an upper surface of the inflator 100 at a certain distance, and the retainer 200 is fixed to the mounting plate 310.

Specifically, the passage (P) is formed between the retainer 200 and the mounting plate 310 to linearly guide a flow of the gas, and the passage (P) may be formed to communicate with the outlets of the inflator 100.

Accordingly, the gas discharged from the inflator 100 may be guided in a linear direction along the passage (P) to flow at a high speed.

In addition, a first end of each external air hole 330 is connected to a middle portion of the passage (P), and a second end of each external air hole 330 is connected to the outside part.

In other words, as the gas flows along the passage (P) at a high speed, according to Bernoulli's law, a pressure drop phenomenon occurs where the pressure at the first end of each external air hole 330 that is connected to the passage (P) becomes lower than surrounding pressure.

Due to the pressure difference, atmospheric pressure pushes external air into the external air holes 330, so that the external air is introduced into the passage (P).

Therefore, as the external air at a relatively low temperature is introduced with the gas of the inflator 100, the temperature of the gas filled in the airbag cushion is reduced and it is possible to prevent the airbag cushion from being damaged by a high-temperature gas.

Moreover, as the external air is introduced into the airbag cushion with the gas of the inflator 100, the airbag cushion of a large volume can be inflated without increasing the capacity of the inflator 100.

In addition, the present disclosure has a structure in which the inflator 100 is mounted to the airbag housing 300 and the retainer 200 is mounted while being spaced apart from the airbag housing 300 to use the spacing as the passage (P).

Figure 3:
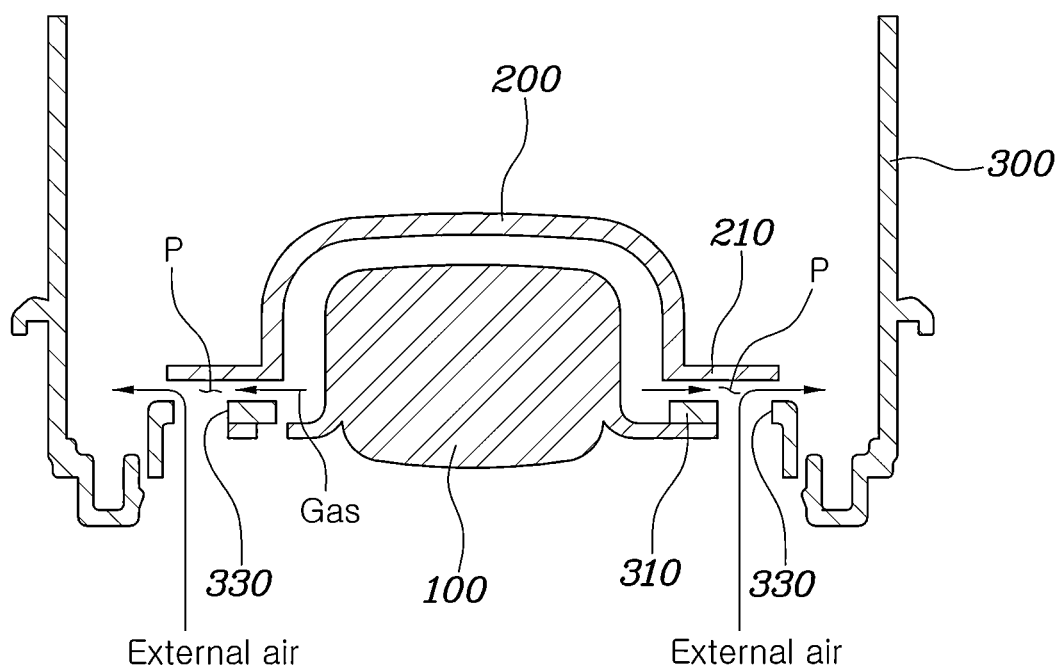
FIG. 3 is a sectional view illustrating a structure of a passage and external air holes according to the exemplary embodiment of the present disclosure.

In describing with reference to FIGS. 2 and 3, studs are respectively provided on corners along the circumference of the retainer 200.

In addition, assembly holes 320 are respectively formed on corners of the mounting plate 310 formed on the inner surface of the airbag housing 300 to correspond to the studs. The studs are assembled inside the assembly holes 320 in a direction from the upper portion of the mounting plate 310 toward the lower portion.

At this point, the retainer 200 and the mounting plate 310 are assembled while a lower surface of the circumference of the retainer 200 and an upper surface of the mounting plate 310 are spaced apart from each other.

Therefore, the spacing portion between the retainer 200 and the mounting plate 310 is used as the passage (P) and the gas of the inflator 100 may flow through the passage (P).

In addition, according to the present disclosure, a guiding part 210 is formed by extending from the circumference of the retainer 200 in a radial direction; and the mounting plate 310 is formed inside the airbag housing 300 in the radial direction parallel to the guiding part 210, and the passage (P) may be formed between the guiding part 210 and the mounting plate 310 in the radial direction.

Referring to FIGS. 2 and 3, the guiding part 210 is formed at a lower end of the retainer 200 in the form of a square plate, and the guiding part 210 is formed to be bent in an outward radial direction.

In addition, the mounting plate 310 is formed below the guiding part 210 in a direction parallel to the guiding part 210, and the passage (P) formed between the guiding part 210 and the mounting plate 310 is linearly formed in the outward radial direction.

Therefore, as the gas of the inflator 100 flows while passing through the passage (P) linearly formed, the gas may flow at a high speed along the passage (P).

Meanwhile, according to the present disclosure, the airbag housing 300 and the retainer 200 are supported by each other with spacing blocks 340 located between the airbag housing 300 and the retainer 200, so the airbag housing 300 may be spaced apart from the retainer 200.

Figure 4:
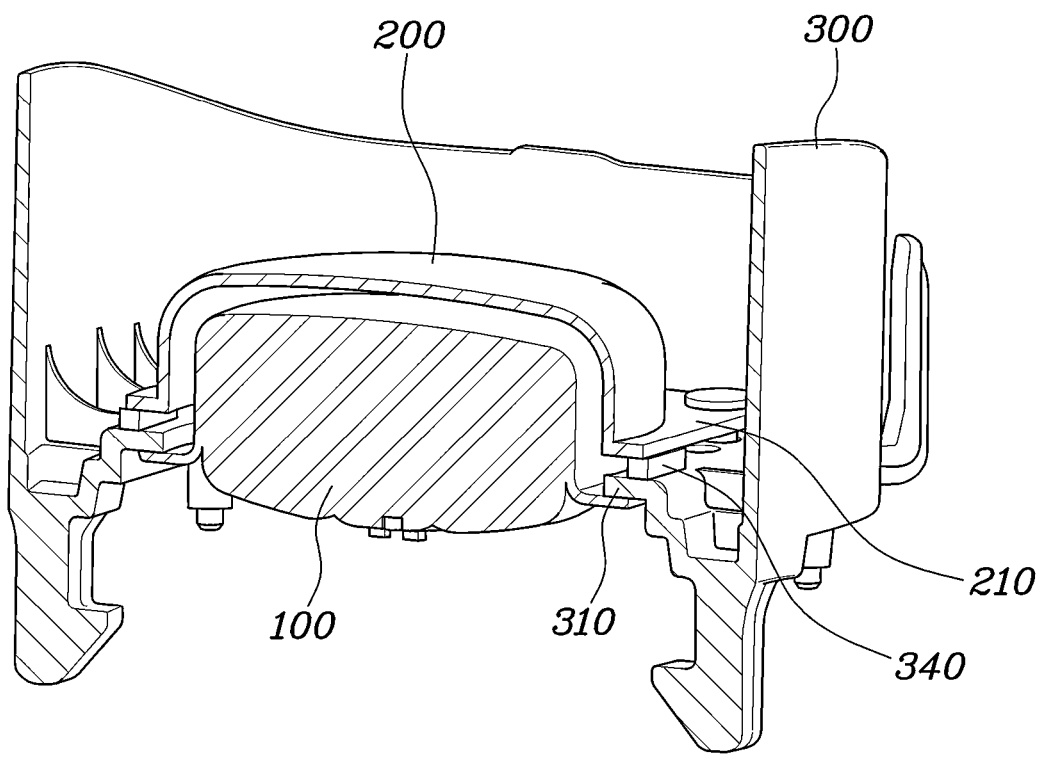
FIG. 4 is a sectional view illustrating a mounting structure of the airbag housing, an inflator, and the retainer according to the exemplary embodiment of the present disclosure.

Referring to FIGS. 2 and 4, the spacing blocks 340 formed in the form of rectangular blocks are fixed to the upper surface of the mounting plate 310, thereby supporting a lower surface of the guiding part 210 of the retainer 200 by upper surfaces of the spacing blocks 340.

Therefore, a gap between the mounting plate 310 and the guiding part 210 is formed by the height of each spacing block 340 to form the passage (P).

In addition, the spacing blocks 340 may be partially arranged along the circumference of the passage (P) around the inflator 100.

Preferably, the spacing blocks 340 may be regularly arranged along the circumference of the passage (P) on the basis of the vertical center shaft of the inflator 100.

In other words, the spacing blocks 340 may be respectively formed on a front portion, a rear portion, a left portion, and a right portion of the upper surface of the mounting plate 310.

Therefore, since the four edges of the retainer 200 are supported by the spacing blocks 340 formed in all directions, the retainer 200 may be stably supported without deviation, so a vertical height of the passage (P) may be uniformly formed.

In addition, the spacing blocks 340 may be provided at locations where the spacing blocks 340 avoid the external air holes 330.

Referring to FIG. 2, the spacing blocks 340 are respectively located at the four edges of the mounting plate 310, and the external air holes 330 are formed close to the assembly holes 320 formed at the corner portions of the mounting plate 310, so the spacing blocks 340 and the external air holes 330 are located relatively far from each other.

Therefore, the gas passing the external air holes 330 through the passage (P) flows at a high speed without interfering with the spacing blocks 340, so the external air may be stably introduced through the external air holes 330.

In addition, according to the present disclosure, the external air holes 330 may be formed in the mounting plate 310.

In other words, the external air holes 330 are formed in a vertical direction orthogonal to the mounting plate 310.

In addition, the external air holes 330 may be partially arranged along the circumference of the passage (P) around the inflator 100.

Preferably, the external air holes 330 may be regularly arranged based on the vertical center shaft or the inflator 100.

In other words, the external air holes 330 may be respectively formed on the left and the right of each assembly hole 320 formed at each corner of the mounting plate 310.

Therefore, as external air is uniformly introduced through each corner of the mounting plate 310, the entire airbag cushion can be uniformly deployed without deviation, and a passenger supported by the airbag cushion is restrained safely.

As described above, according to the present disclosure, as gas flows along the passage (P) at a high speed, a pressure difference occurs where the pressure at the first end of each external air hole 330 that is connected to the passage (P) becomes lower than the surrounding pressure according to Bernoulli's law, and the atmospheric pressure pushes external air into the external air holes 330 by the pressure difference so that external air is introduced into the passage (P).

Therefore, as external air at a relatively low temperature is introduced into the airbag cushion with the gas of the inflator 100, the temperature of the gas filled in the airbag cushion is reduced and it is possible to prevent the airbag cushion from being damaged by a high-temperature gas.

Moreover, as the external air is introduced into the airbag cushion with the gas of the inflator 100, the airbag cushion of a large volume can be inflated without increasing the capacity of the inflator 100.

Although the present disclosure was described in detail above in relation to specific embodiments, it is apparent to those skilled in the art that the present disclosure may be changed and modified in various ways without departing from the scope of the present disclosure, which is provided in the following claims.

What is claimed is:

1. An airbag device comprising:
   an inflator configured to discharge a gas;
   a retainer configured to cover the inflator and to define a passage to linearly guide the gas;
   an airbag housing having external air holes to allow external air to be supplied into the passage by the gas passing through the passage at high speed, wherein the external air holes are disposed at a middle portion of the passage; and
   spacing blocks disposed between the airbag housing and the retainer so that the airbag housing and the retainer are spaced apart from each other.

2. The airbag device of claim 1, wherein the inflator is mounted to the airbag housing; and
   the retainer is mounted to the airbag housing and spaced apart from the airbag housing, and the spacing between the retainer and the airbag housing defines the passage.

3. The airbag device of claim 2, wherein the retainer includes a guiding part extending from a circumference of the retainer in a radial direction; and
   a mounting plate is disposed in the airbag housing in the radial direction in parallel to the guiding part and the passage is defined between the guiding part and the mounting plate in the radial direction.

4. The airbag device of claim 3, wherein the external air holes are disposed in the mounting plate.

5. The airbag device of claim 3, wherein the external air holes are partially arranged along a circumference of the passage around the inflator.

6. The airbag device of claim 5, wherein the external air holes are regularly arranged along the circumference of the passage based on a vertical center shaft of the inflator.

7. The airbag device of claim 1, wherein the spacing blocks are partially arranged along a circumference of the passage around the inflator.

8. The airbag device of claim 7, wherein the spacing blocks are regularly arranged on the circumference of the passage based on a vertical center shaft of the inflator.

9. The airbag device of claim 1, wherein the spacing blocks are disposed at positions spaced apart from the external air holes.

\* \* \* \* \*